United States Patent
Knitt et al.

(10) Patent No.: US 11,866,117 B2
(45) Date of Patent: Jan. 9, 2024

(54) MOTORCYCLE WITH VIRTUAL BRAKING AND VIRTUAL CLUTCH

(71) Applicant: LiveWire EV, LLC, Milwaukee, WI (US)

(72) Inventors: Andrew Alfred Knitt, Oconomowoc, WI (US); James Joseph Williams, Waterford, WI (US); Samuel Nicholas Reitinger, Wauwatosa, WI (US); James Sadauckas, Driggs, ID (US)

(73) Assignee: LiveWire EV, LLC, Milwaukee, WI (US)

( * ) Notice: Subject to any disclaimer, the term of this patent is extended or adjusted under 35 U.S.C. 154(b) by 932 days.

(21) Appl. No.: 16/745,162

(22) Filed: Jan. 16, 2020

(65) Prior Publication Data

US 2020/0231241 A1 Jul. 23, 2020

Related U.S. Application Data

(60) Provisional application No. 62/793,127, filed on Jan. 16, 2019.

(30) Foreign Application Priority Data

Jan. 15, 2020 (EP) ..................................... 20151983
Jan. 15, 2020 (JP) ................................. 2020-004188

(51) Int. Cl.
*B62K 11/00* (2006.01)
*B60L 7/10* (2006.01)
(Continued)

(52) U.S. Cl.
CPC ............... *B62K 11/00* (2013.01); *B60L 7/10* (2013.01); *B60L 50/60* (2019.02); *B62K 23/04* (2013.01);
(Continued)

(58) Field of Classification Search
CPC . B60K 11/00; B60L 50/60; B60L 7/10; B62K 23/04; B62K 2204/00; B62M 7/04; H02P 3/06
See application file for complete search history.

(56) References Cited

U.S. PATENT DOCUMENTS 3,522,338 A 7/1970 Kass et al.
3,921,745 A 11/1975 McCulloch et al.
(Continued)

FOREIGN PATENT DOCUMENTS

CN 103171444 A 6/2013
CN 104718100 A 6/2015
(Continued)

OTHER PUBLICATIONS

Rule 62a(1) EPC communication issued by the European Patent Office for Application No. 20151983.2 dated Jun. 10, 2020 (1 page).
(Continued)

*Primary Examiner* — Tony H Winner
(74) *Attorney, Agent, or Firm* — Michael Best & Friedrich LLP

(57) ABSTRACT

Systems and methods for operating an electric motor of a two-wheeled vehicle. One method includes detecting a position of a drive torque control included in the vehicle, detecting a position of a regenerative brake control included in the vehicle, mapping the detected position of the drive torque control to a requested driving torque, mapping the position of the regenerative brake control to a requested braking torque, determining, with an electronic control unit, a torque command based on the requested driving torque and the requested torque, and transmitting the torque command to an electric motor included in the vehicle.

19 Claims, 8 Drawing Sheets

(51) Int. Cl.
  *B62M 7/04* (2006.01)
  *H02P 3/06* (2006.01)
  *B60L 50/60* (2019.01)
  *B62L 3/02* (2006.01)
  *B62L 3/04* (2006.01)
  *B62K 23/04* (2006.01)

(52) U.S. Cl.
  CPC .................................. *B62L 3/02* (2013.01); *B62L 3/04* (2013.01); *B62M 7/04* (2013.01); *H02P 3/06* (2013.01); *B60L 2200/12* (2013.01); *B62K 2204/00* (2013.01)

(56) References Cited

U.S. PATENT DOCUMENTS

| | | | |
|---|---|---|---|
| 4,936,405 A | 6/1990 | Hrovat | |
| 5,241,478 A | 8/1993 | Inoue et al. | |
| 5,377,791 A | 1/1995 | Kawashima et al. | |
| 5,384,522 A | 1/1995 | Toriyama et al. | |
| 5,519,616 A | 5/1996 | Maeda | |
| 5,552,988 A | 9/1996 | Kawaguchi et al. | |
| 5,613,569 A | 3/1997 | Sugioka et al. | |
| 5,644,202 A | 7/1997 | Toriyama et al. | |
| 5,905,349 A | 5/1999 | Farkas et al. | |
| 5,931,245 A | 8/1999 | Uetake et al. | |
| 6,011,378 A | 1/2000 | Tabata et al. | |
| 6,054,818 A | 4/2000 | Tabata et al. | |
| 6,144,125 A | 11/2000 | Birkestrand et al. | |
| 6,155,369 A | 12/2000 | Whittaker | |
| 6,326,765 B1 | 12/2001 | Highes et al. | |
| 6,724,164 B2 | 4/2004 | Shimizu et al. | |
| 6,724,165 B2 | 4/2004 | Hughes | |
| 6,876,300 B2 | 4/2005 | Ponziani | |
| 6,938,717 B2 | 9/2005 | Gaudiano | |
| 7,192,040 B2 | 3/2007 | Xie | |
| 7,520,351 B2 | 4/2009 | Uchisasai et al. | |
| 7,527,111 B2 | 5/2009 | Katsuhiro et al. | |
| 7,762,231 B2 | 7/2010 | Dugas et al. | |
| 8,002,062 B2 | 8/2011 | Saitou | |
| 8,265,814 B2 | 9/2012 | Cominetti | |
| 8,424,626 B2 | 4/2013 | Nomura et al. | |
| 8,761,984 B2 | 6/2014 | Yates et al. | |
| 8,816,613 B2 | 8/2014 | Lee | |
| 8,901,861 B2 | 12/2014 | Luke et al. | |
| 8,973,690 B2 | 3/2015 | Yates, III et al. | |
| 9,010,468 B2 | 4/2015 | Nomura et al. | |
| 9,043,067 B2 | 5/2015 | Yates et al. | |
| 9,043,106 B2 | 5/2015 | Ingram et al. | |
| 9,096,132 B2 | 8/2015 | Matsuda | |
| 9,132,825 B2 | 9/2015 | Riegels | |
| 9,340,299 B2 | 5/2016 | Yates et al. | |
| 9,387,764 B2 | 7/2016 | Matsuda | |
| 9,434,362 B2 | 9/2016 | Harding et al. | |
| 9,457,668 B2 | 10/2016 | Matsuda | |
| 9,616,755 B2 | 4/2017 | Matsuda | |
| 9,650,138 B2 | 5/2017 | Yates | |
| 9,815,563 B2 | 11/2017 | Yates et al. | |
| 9,868,526 B2 | 1/2018 | Yates | |
| 2003/0169002 A1 | 9/2003 | Hughes | |
| 2010/0243349 A1 | 9/2010 | Nomura et al. | |
| 2010/0252345 A1 | 10/2010 | Hoshino | |
| 2011/0233994 A1 | 9/2011 | Harding et al. | |
| 2012/0080249 A1 | 4/2012 | Yates, III et al. | |
| 2012/0133310 A1 | 5/2012 | Lee | |
| 2012/0138375 A1 | 6/2012 | Hughes | |
| 2012/0217075 A1 | 8/2012 | Nomura et al. | |
| 2013/0033203 A1 | 2/2013 | Luke et al. | |
| 2013/0134909 A1 | 5/2013 | Lee | |
| 2013/0162009 A1 | 6/2013 | Mitts et al. | |
| 2014/0172209 A1 | 6/2014 | Ide | |
| 2015/0222208 A1 | 8/2015 | Hisano | |
| 2015/0258898 A1 | 9/2015 | Matsuda | |
| 2017/0036547 A1 | 2/2017 | Mizui | |
| 2017/0313207 A1 | 11/2017 | Gherardi et al. | |
| 2018/0099675 A1 | 4/2018 | Boisvert et al. | |

FOREIGN PATENT DOCUMENTS

| | | |
|---|---|---|
| EP | 1084049 B1 | 2/2003 |
| EP | 2 383 865 A2 | 11/2011 |
| EP | 2613984 B1 | 7/2015 |
| EP | 2 910 401 A1 | 8/2015 |
| EP | 2 910 402 A1 | 8/2015 |
| EP | 3 401 201 A1 | 11/2018 |
| GB | 490926 A | 8/1938 |
| GB | 591470 A | 8/1947 |
| JP | H11332005 A | 11/1999 |
| JP | 2005119349 A | 5/2005 |
| JP | 2005520472 A | 7/2005 |
| JP | 2005224034 A | 8/2005 |
| JP | WO2012090253 A1 | 6/2014 |
| JP | WO2012111083 A1 | 7/2014 |
| JP | 2014176256 A | 9/2014 |
| JP | WO2014064728 A1 | 9/2016 |
| JP | 2017077126 A | 4/2017 |
| JP | 2018007443 A | 1/2018 |
| WO | WO1997018125 A1 | 5/1997 |
| WO | WO1999061306 A1 | 12/1999 |
| WO | WO2010150238 A1 | 12/2010 |
| WO | WO2017205908 A1 | 12/2017 |
| WO | WO2018172308 A1 | 9/2018 |

OTHER PUBLICATIONS

Extended Search Report issued from the European Patent Office for related Application No. 20151983.2 dated Sep. 28, 2020 (11 Pages).
European Patent Office Extended Search Report for Application No. 22212264.0 dated Apr. 3, 2023 (11 pages).
Japanese Patent Office Action for Application No. 2020004188 dated Aug. 22, 2023 (12 pages including English translation).

MOTORCYCLE WITH VIRTUAL BRAKING AND VIRTUAL CLUTCH

RELATED APPLICATIONS

This application claims priority to U.S. Provisional Application No. 62/793,127, filed Jan. 16, 2019, the entire content of which is incorporated by reference herein.

FIELD

Embodiments described herein relate to vehicles and, more particularly, relate to two-wheeled vehicles that use an electric powertrain with a regenerative braking system to supplement or replace a mechanical, frictional brake, such as a hydraulic brake, to simulate a clutch, or a combination thereof. Accordingly, embodiments described herein can provide a virtual brake or clutch that simulates a mechanical brake or clutch.

SUMMARY

Mechanical, frictional brakes, such as hydraulic brakes, add cost and weight, which can impact the performance of a vehicle, especially electric vehicles, such as electric motorcycles. Furthermore, mechanical, frictional brakes dissipate kinetic energy, which otherwise could be used to charge an electric power store included in the vehicle, which may otherwise limit the range and operation of an electric vehicle. Mechanical clutches similarly add cost and weight to a two-wheeled vehicle.

Accordingly, embodiments described herein provide methods and systems for regeneratively braking at least one wheel of a vehicle, such as, for example, an electric motorcycle. In some embodiments, regenerative braking is used as the sole mechanism to brake a wheel of the vehicle, such as the rear wheel of a two-wheeled vehicle. Replacing a rear hydraulic brake with regenerative braking reduces the cost, weight, and complexity of the vehicle, which, as noted above, impacts the performance of the vehicle.

For example, one embodiment provides a two-wheeled vehicle. The two-wheeled vehicle includes an electric motor, a wheel drivably coupled to the electric motor to propel the two-wheeled vehicle, a drive torque control movable between a first plurality of positions, and a regenerative brake control movable between a second plurality of positions. The vehicle also includes an electronic control unit. The electronic control unit is configured to detect a position of the drive torque control from the first plurality of positions, map the detected position of the drive torque control to a requested driving torque, detect a position of the regenerative brake control from the second plurality of positions, map the position of the regenerative brake control to a requested braking torque, sum the requested driving torque and the requested braking torque to determine a torque command, and transmit the torque command to the electric motor. In some embodiments, regenerative braking provided via the electric motor based on the torque command is the sole mechanism for braking the wheel.

Another embodiment provides a method of operating an electric motor of a two-wheeled vehicle. The method includes detecting a position of a first control included in the two-wheeled vehicle. The first control controls a drive torque of the two-wheeled vehicle. The method also includes detecting a position of a second control included in the two-wheeled vehicle, mapping the detected position of the first torque control to a first requested torque, mapping the position of the second control to a second requested torque, determining, with an electronic control unit, a torque command based on the first requested torque and the second requested torque, and transmitting the torque command to an electric motor included in the vehicle.

Yet another embodiment provides a system for operating an electric motor of a two-wheeled vehicle. The system includes at least one electronic control unit included in the two-wheeled vehicle. The at least one electronic control unit is configured to detect a position of a first control included in the vehicle, the first control controlling a drive torque of the two-wheeled vehicle, detect a position of a second control included in the two-wheeled vehicle, map the detected position of the first control to a first requested torque, map the position of the second control to a second requested torque, determine a torque command based on the first requested torque and the second requested torque, and transmit the torque command to an electric motor included in the vehicle.

Other features and aspects of the invention will become apparent by consideration of the following detailed description and accompanying drawings.

DETAILED DESCRIPTION

Figure 1:
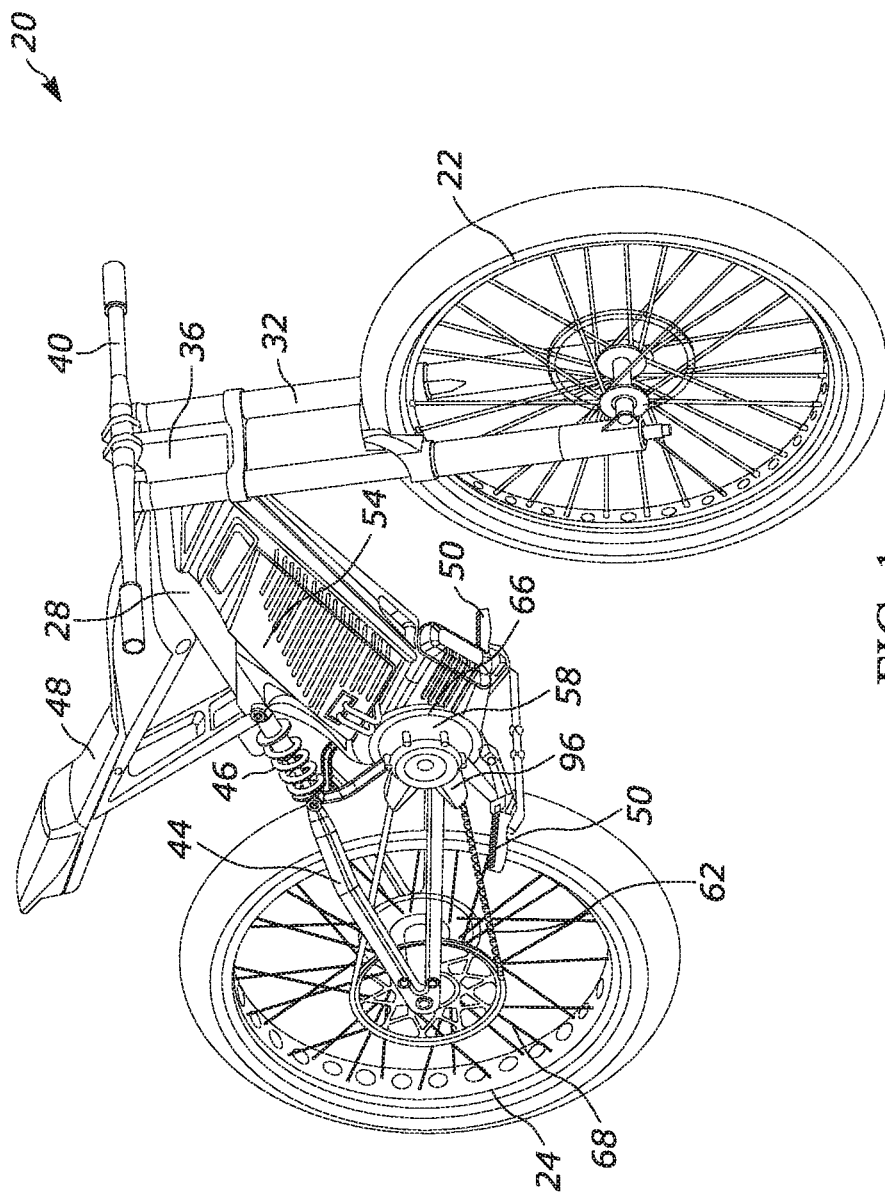
FIG. 1 is a perspective view of a two-wheeled vehicle according to one embodiment.
Figure 2:
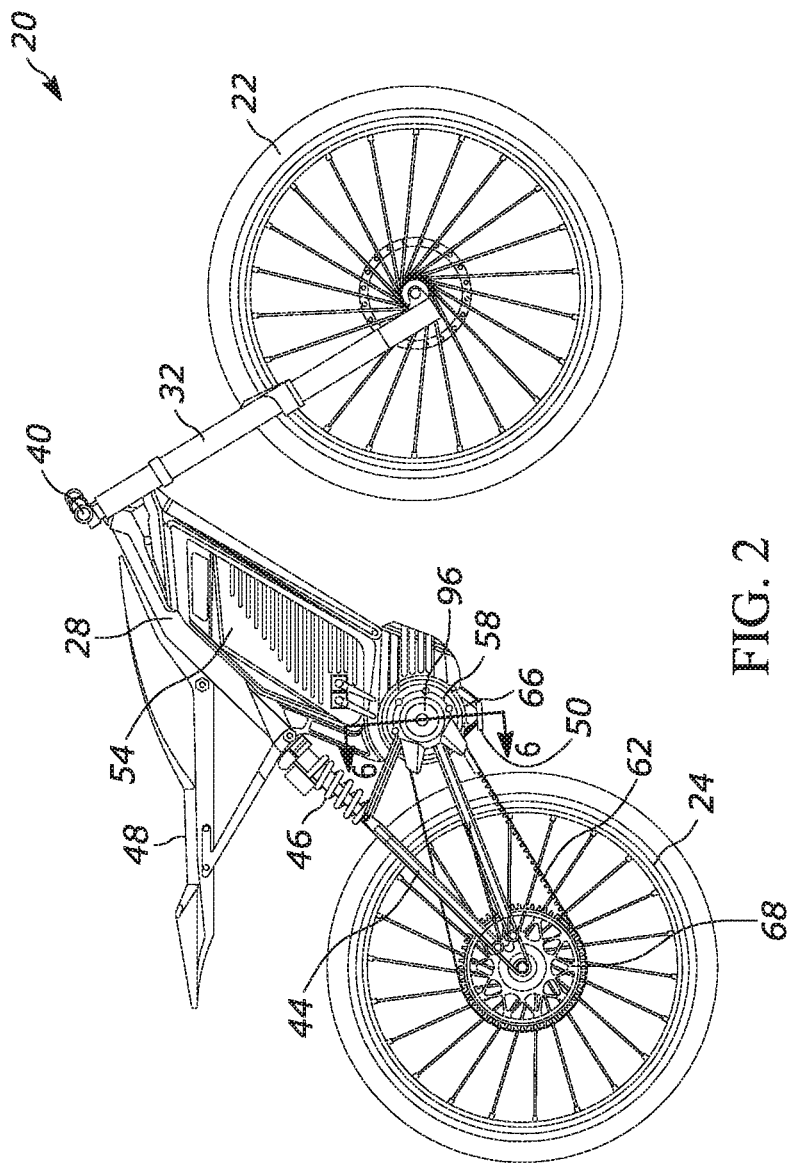
FIG. 2 is a right side view of the two-wheeled vehicle of FIG. 1.
Figure 3:
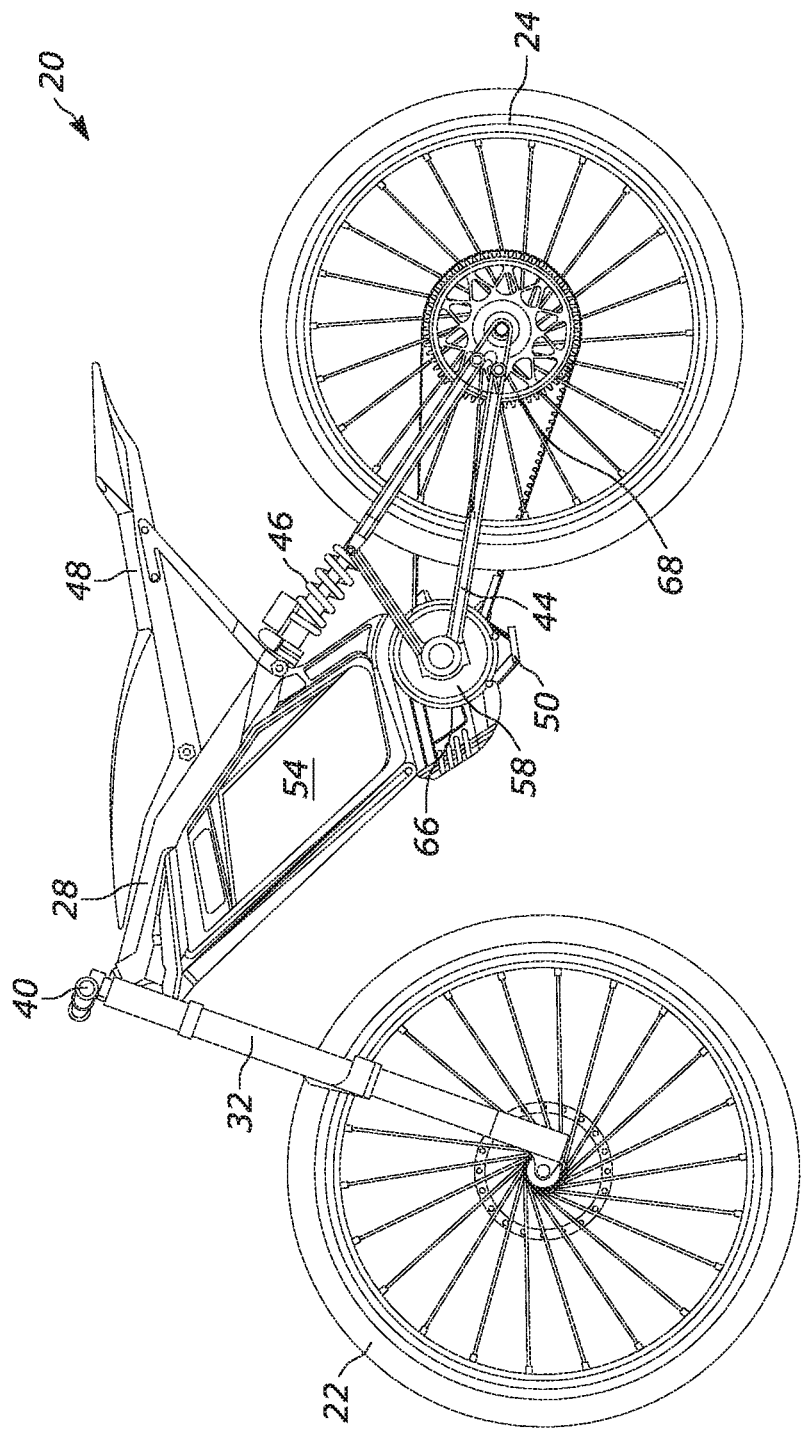
FIG. 3 is a left side view of the two-wheeled vehicle of FIG. 1.

One or more embodiments are described in the following description and illustrated in the accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality described herein as being performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality (or portions thereof) by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a two-wheeled vehicle 20 according to one embodiment. It should be understood the systems and methods described herein may be applicable to any kind of two-wheeled vehicle (for example, a motorcycle, a moped, an electric bike, and the like). The two-wheeled vehicle 20 includes front and rear wheels 22, 24 (e.g., a single front wheel 22 and a single rear wheel 24 aligned with the front wheel 22 to define a single track). The vehicle 20 includes a frame structure having a main frame 28. A front fork 32 supports the front wheel 22 ahead of the main frame 28. The front fork 32 is rotatably coupled to a head tube 36 of the main frame 28. Handlebars 40 are coupled to the front fork 32 to allow a rider to control the orientation of the front fork 32 and the front wheel 22. A rear swingarm 44 supports the rear wheel 24 for rotation therein. The rear swingarm 44 enables pivoting suspension movements of the rear wheel 24 and the swingarm 44 together relative to the main frame 28 about an axis A. In addition to the pivoting support at the axis A, the swingarm 44 is coupled to the main frame 28 through a shock absorber unit 46 (e.g., including a coil spring and a hydraulic damper). The vehicle 20 further includes at least one seat 48 (e.g., saddle seat(s) for operator and optionally pillion passenger) and at least one set of foot supports 50 (e.g., laterally extending foot pegs).

As illustrated, the vehicle 20 is an electric motorcycle driven by an electric powertrain including an electric power store 54 (e.g., a battery pack) and an electric motor 58 electrically coupled to the electric power store 54 to convert stored electrical energy from the electric power store 54 into rotational kinetic energy for driving the vehicle 20. As illustrated, the electric motor 58 powers the rear wheel 24 through an endless drive member 62 (e.g., belt or chain) in the form of a loop wrapped around a drive sprocket 66 and a driven sprocket 68 that is fixedly secured to the rear wheel 24. The drive sprocket 66 that drives the endless drive member 62 is fixed to rotate integrally with an output shaft of the electric motor 58 about an axis A. As such, the vehicle 20 is provided without a multi-speed transmission between the electric motor 58 and the drive sprocket 66, and without any gearbox whatsoever. In some embodiments, the electric motor 58 includes a high pole count motor having high torque density.

Figure 4:
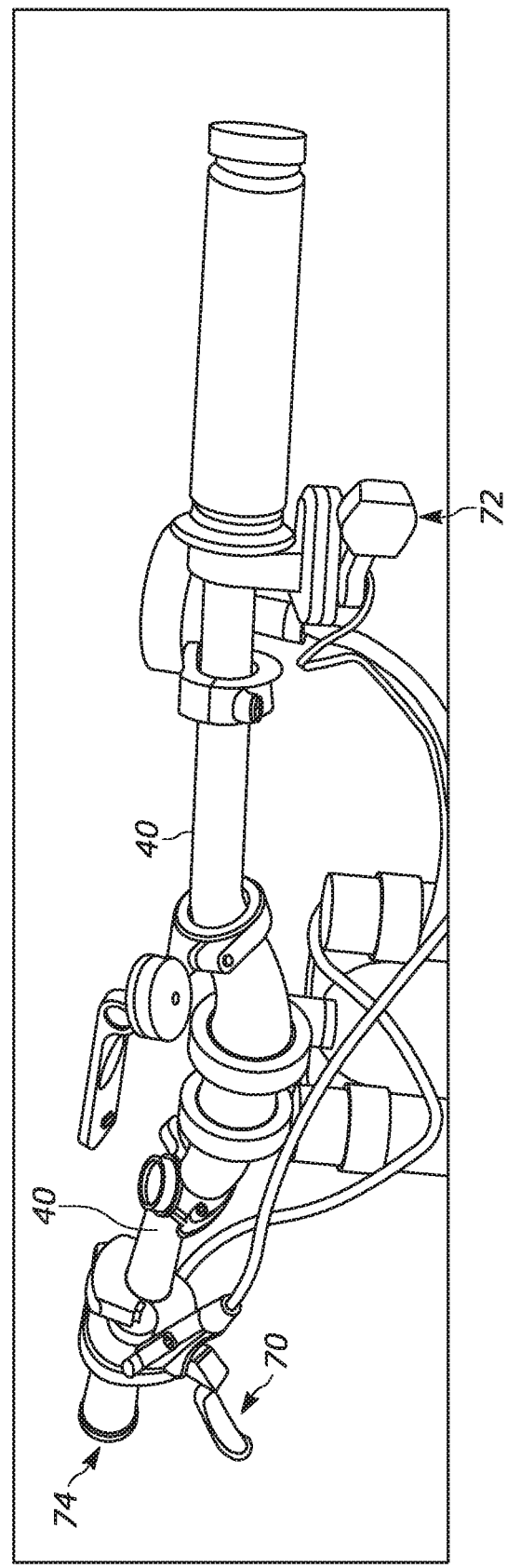
FIG. 4 illustrates the two-wheeled vehicle of FIG. 1 including a twist grip and a regenerative brake control according one embodiment.

The vehicle 20 uses regenerative braking to brake one or both of the wheels 22, 24. In particular, the vehicle 20 uses regenerative capabilities of the electric motor 58 to supplement or replace a mechanical, frictional brake (e.g., a hydraulic brake) for one or both of the wheels 22, 24. For example, as illustrated in FIG. 4, the handlebar 40 of the vehicle 20 includes a braking control for each wheel 22, 24. In particular, as illustrated, the vehicle 20 includes a traditional front brake lever 70 on the right side of the handlebar 40 for controlling braking of the front wheel 22 (via a mechanical, frictional brake, such as a hydraulic brake) and includes a control 72 on the left side of the handlebar 40 for controlling regenerative braking of the rear wheel 24. As described below, in some embodiments, the control 72 operates as a regenerative brake control wherein the operator of the vehicle 20 uses the control 72 to request varying amounts of negative torque from the electric powertrain, which then applies the requested torque to stop or slow the vehicle 20 (i.e., stop or slow the rear wheel 24). During braking of the rear wheel 24, braking energy is captured back into the electric power store 54 rather than being dissipated as heat through application of a mechanical, frictional brake (e.g., brake caliper/rotor friction). Thus, in some embodiments, no mechanical, frictional brake is installed for the rear wheel 24, which reduces the cost, weight, and complexity of the vehicle 20. For example, in some embodiments, the electric powertrain provides at least the same amount of, if not more, braking force than a traditional hydraulic brake installed on motorcycles and avoids the cost and weight associated with a more upgraded mechanical braking system, such as an upgraded hydraulic brake.

As illustrated in FIG. 4, in some embodiments, the control 72 includes a pivotable (pivoting) lever that an operator pulls toward the handlebar 40 to brake the rear wheel 24. An amount or degree that the lever is pulled or pivoted equates to an amount of braking requested by the operator. Thus, in some embodiments, the control 72 allows the operator to continuously vary the amount of regenerative brake based on how much the operator pulls the lever toward the handlebar 40. When the operator does not pull on the lever, the lever is biased (using a spring or similar biasing member) to a home position where no braking is requested of the rear wheel 24 through the control 72. It should be understood that, in some embodiments, the control 72 may include a different type of actuator than a pivoting lever illustrated in FIG. 4. Furthermore, in some embodiments, the control 72 may be positioned at other locations on the vehicle 20 than the handlebar 40. For example, in some embodiments, the control 72 includes a foot pedal instead of the hand-actuator lever illustrated in FIG. 4.

The amount of regenerative braking applied to the rear wheel 24 may be controlled based on a combination of inputs, including an input received through the control 72 as well as an input received through a rotational twist grip also coupled to the handlebar 40. For example, as illustrated in FIG. 4, the vehicle 20 includes a twist grip 74 that is rotatable through a plurality of positions. A twist grip sensor, also included in the vehicle 20, is configured to detect a position of the twist grip 74, such as via a Hall Effect sensor, a rotary encoder, or the like. Although the twist grip 74 is illustrated in FIG. 4 as being positioned on the right side of the handlebar 40, in other embodiments, the twist grip 74 may be positioned on the left side of the handlebar 40. Also, in some embodiments, a different type of actuator (e.g., a pedal, a pivoting lever, or the like) may be used in place of the rotatable twist grip 74 as illustrated to receive input from the operator regarding a requested driving torque for the vehicle 20 (i.e., the rear wheel 24). Such actuators may be generally referred to herein as drive torque controls.

The detected position of the twist grip 74 is mapped to a requested driving torque. In some embodiments, the mapping between the current position of the twist grip 74 and the associated torque request may also be based on a current speed of the vehicle 20, which may be determined based on an operating parameter of the electric motor 58, such as revolutions per minute (RPM). For example, in some embodiments, a two-dimensional look-up table may be used to map a current twist grip position and a current speed to a requested driving torque.

Also, in some embodiments, the vehicle 20 can be operated in one of a plurality of ride modes, which can be selected manually by the operator, selected automatically based on operating conditions of the vehicle 20, or both. Each ride mode may provide different operation of the vehicle 20, such as by providing maximum speed or acceleration, providing efficient energy usage, or the like. Accordingly, in these embodiments, a specific two-dimensional table for the currently-activated ride mode may be used to map a position of the twist grip 74 and a current speed to a requested driving torque.

Independent of the torque request determined based on the position of the twist grip 74, a second (negative) torque request is generated based on a positon of the control 72. This mapping may be performed using an equation or a one-dimensional look-up table. For example, like the twist grip 74, a position of the control 72 is detected by a control sensor (e.g., including an optical sensor, a mechanical sensor, an electrical sensor, or the like) and the detected position is mapped to a requested braking torque. In some embodiments, when an equation is used to perform the mapping, the equation may include determining a percentage of activation of the control 72, such as by dividing a detected position of the control 72 by a predetermined maximum position. In such embodiments, the percentage of activation of the control 72 can be multiplied by a maximum amount of regenerative braking torque available to calculate a requested braking torque (N/m). In some embodiments, the maximum position of the control 72, the maximum available braking torque, or both may be defined in memory or software to allow the activation of the control 72 to be configured for different motorcycles, operators, driving conditions, or the like. In some embodiments, the requested regenerative braking torque defined by the position of the control 72 may vary based on the currently-selected ride mode similar to the twist grip 74 as described above. However, in other embodiments, the amount of regenerative braking requested via the control 72 remains the same regardless of the currently-selected ride mode.

In some embodiments, the requested driving torque defined by the position (rotation) of the twist grip 74 is summed with the requested braking torque defined by the position of the control 72 to determine a torque command for the electric motor 58, which is transmitted to a motor controller for the electric motor 58. Thus, the generated torque command represents a blended command accounting for any amount of driving torque requested by the operator via the twist grip 74 as well as any amount of braking torque requested by the operator via the control 72. When the torque command is negative, the electric motor 58 regenerative brakes the rear wheel 24 and energy captured during the regenerative braking may be stored in the power store 54. When the torque command is positive, the electric motor 58 drives the rear wheel 24 to propel the vehicle 20 forward. However, the amount of driving torque represented by the torque command may be less than a previous torque command, which may similarly result in a slowdown (deceleration) of the vehicle 20 even though the torque command is positive.

In some embodiments, torque limits may be applied to the summed torque value or the individual torque values included in the sum before transmitting a torque command based on the sum to the motor controller, such as to keep the torque command transmitted to the motor controller within operating limits of the electric powertrain, to provide advanced braking functionality, such as traction control or anti-lock braking, or the like. In other embodiments, the motor controller or other components included the vehicle 20 may further process the torque request before the torque request is implemented via the electric motor 58.

The requested driving torque defined by the position of the twist grip 74 can be positive or negative. In other words, this torque request can request traction power or regenerative braking. For example, the torque request defined by a position of the twist grip 74 may include a negative torque (regenerative braking) to provide a coast down of the vehicle 20. Accordingly, as used in the present application, the "requested driving torque" (defined based on the position of the twist grip 74) can be positive or negative. However, any negative torque requested based on the position of the twist grip 74 is independent of and in addition to any regenerative braking control (negative torque) requested via the control 72.

Figure 5:
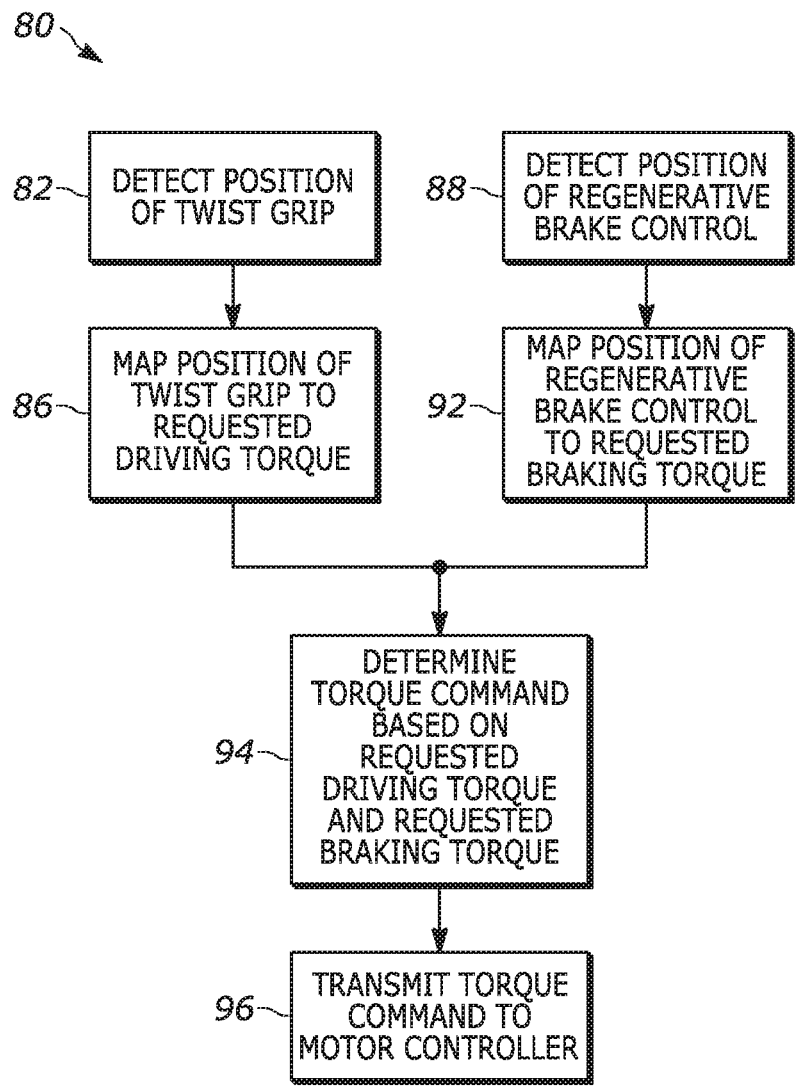
FIG. 5 is a flow chart illustrating a method of operating an electric motor of the two-wheeled vehicle of FIG. 1 according to one embodiment.
Figure 6:
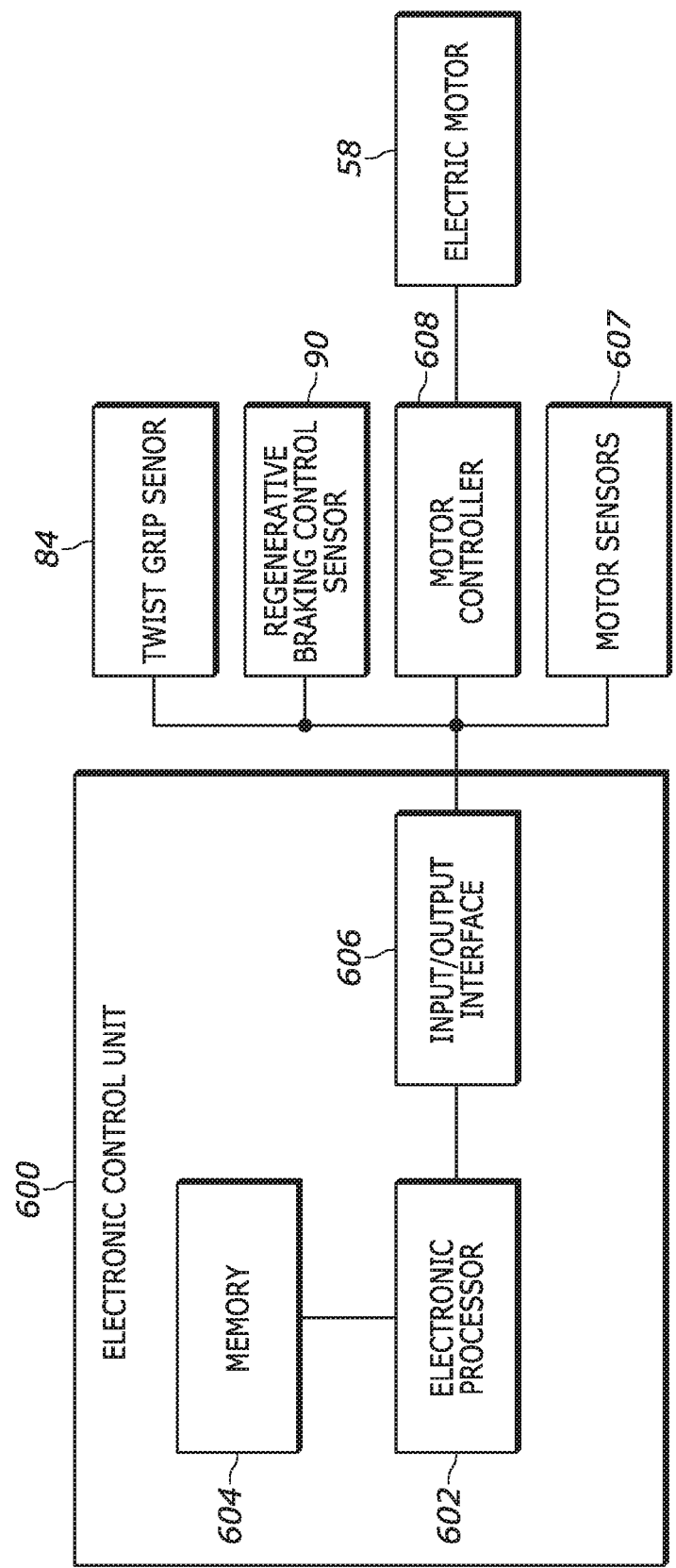
FIG. 6 is a diagram illustrating an electronic control unit included in the two-wheeled vehicle of FIG. 1 according to one embodiment FIG. 7 schematically illustrates input processing for generating a requested torque based on a position of the regenerative braking control included in the two-wheeled vehicle of FIG. 1 according to one embodiment.

FIG. 5 is a flowchart illustrating a method 80 of generating a virtual brake for the electric motor 58 of the vehicle 20 according to one embodiment, such as a regenerative braking torque. The method 80 is performed by an electronic control unit (ECU) included in the motorcycle (for example, the ECU 600 of FIG. 6). As illustrated in FIG. 6, the ECU 600 may include an electronic processor 602, such as a microprocessor, an application-specific integrated circuit, or the like. In some embodiments, the ECU 600 also includes non-transitory, computer-readable memory 604, such as for storing limits or other predetermined parameters for the regenerative braking, mappings or tables, or the like. The ECU 600 also includes an input/output interface 606 for communicating with other components included in the vehicle 20 over one or more wired or wireless communication channels or networks. For example, the ECU 600 may be configured to receive data from a twist grip sensor 84, a control sensor 90, one or more sensors 607 monitoring operating parameters of the electric motor 58 (e.g., detecting RPM), or the like and may also be configured to transmit data to a motor controller 608 for the electric motor 58, including a torque command. It should be understood that the functionality described herein as being performed by the ECU 600 may be distributed over multiple electronic control units. For example, in some embodiments, other components included in the vehicle 20, such as other ECUs, sensors, or the like, may perform at least a portion of the method 80.

As illustrated in FIG. 5, the method 80 includes detecting a position of the twist grip 74 (at block 82). As described above, a twist grip sensor 84 may be configured to detect the position of the twist grip 74 (from among a plurality of position) using a rotary encoder, a Hall Effect sensor, or the like and output a current position of the twist grip 74, which may represent a value between 0% and 100% of a maximum driving torque available. In some embodiments, redundant sensing assemblies (e.g., sensor assemblies) may be used to ensure proper operation of the twist grip 74 and the twist grip sensor 84. The twist grip sensor 84 may be configured to determine not only a position (604A) of the twist grip 74, but also detect faults or other errors. Also, in some embodiments, the twist grip sensor 84 may apply various checks for faults or other errors. As noted above, the ECU 600 may communicate with the twist grip sensor 84. Accordingly, in some embodiments, the ECU 600 detects the current position of the twist grip 74 based on data received from the twist grip sensor 84.

The method 80 also includes mapping the detected position of the twist grip 74 to a requested driving torque (at block 86). As also described above, the position of twist grip 74 may be mapped to a requested driving torque using a two-dimensional table that maps twist grip position and motorcycle speed (RPM of the electric motor 58) to a requested driving torque. In some embodiments, when the vehicle 20 includes a plurality of ride modes, a requested driving torque may be calculated for each ride mode, and the ECU 600 can select the requested driving torque calculated for the currently-activated ride mode. In other embodiments, the ECU 600 may only calculate the requested driving torque for the currently-activated ride mode.

The method 80 also includes detecting a position of the control 72 (at block 88). As described above, a control sensor 90 may be configured to detect the position of the control 72 (from among a plurality of position) and output a current position of the control 72, which may represent a value between 0% and 100% of a predetermined maximum braking torque available. In some embodiments, the control sensor 90 may apply various checks for faults or other errors. As noted above, the ECU 600 may communicate with the control sensor 90 and, thus, the ECU 600 may detect the current position of the control 72 based on data received from the control sensor 90.

Figure 7:
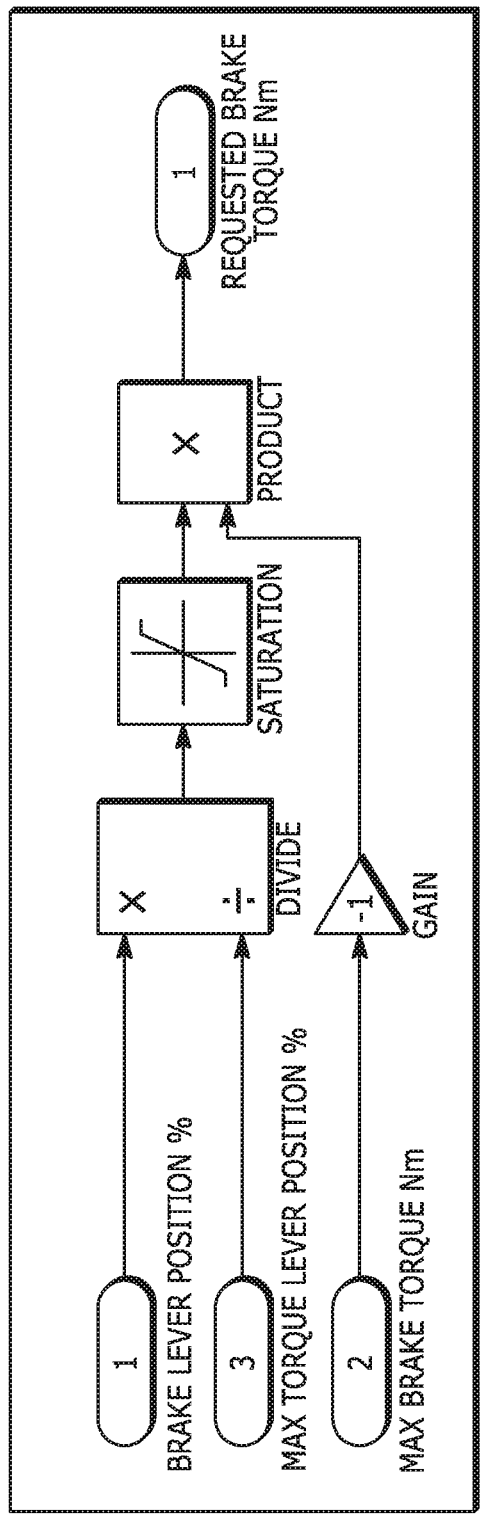

The method 80 also includes mapping a position of the control 72 to a requested braking torque (at block 92). As also described above, the position of the control 72 may be mapped to a requested braking torque using a one-dimensional table or an equation. For example, FIG. 7 schematically illustrates one equation that may be applied by the ECU 600 to perform the mapping. As illustrated in FIG. 7, the ECU 600 divides the current position of the control 72 by a maximum position (stored in memory or software) and multiples the result by a maximum braking torque (in N/m), wherein the result of this multiplication represents the requested braking torque (in N/m). As noted above, the ECU 600 may also perform various checks for faults or other errors.

Returning to FIG. 5, at block 94, the ECU 600 determines a torque command based on the requested driving torque and the requested braking torque. The resulting torque command is then transmitted to the motor controller 608 for the electric motor 58 (at block 96). In some embodiments, the determination of the torque command includes summing the requested driving torque (as defined by the position of the twist grip 74) and the requested braking torque (as defined by the position of the control 72).

In some embodiments, when regenerative braking is used as the sole mechanism to brake a wheel of the motorcycle, additional braking features, such as anti-locking braking systems and traction control, may also implemented in the vehicle 20 using regenerative braking while avoiding the need for heavy and expensive systems for providing such systems (e.g., a hydraulic ABS unit). In addition, through configuration of both the mechanical operation of the control 72 and the mapping of positions of this control 72 to requested braking torques, the regenerative braking can reproduce the functionality and feel of a traditional mechanical, frictional brake, such as a hydraulic rear brake (via the process described herein, which is also referred to herein as providing a virtual brake), which allows the cost, weight, and duplication of a mechanical braking system to be eliminated without sacrificing performance or operator experience. For example, although the control 72 is an electronic control or lever, the biasing forces applied through the control 72 may be configured to provide similar feedback to an operator as if the operator were activating a traditional brake lever. In particular, since traditional brake levers (or pedal) may provide increased resistance the more the lever (or pedal) is actuated, the control 72 can provide similar feedback to the operator. Furthermore, just as an operator could apply a traditional frictional brake (a hydraulic brake) and also activate the twist grip 74 to effectively "drive through" the applied brake, the maximum amount of torque applied through regenerative braking can similarly be configured (through the mapping of control 72 position to braking torque) to be less than a maximum driving torque that can be requested through activation of the twist grip 74.

In some embodiments, the biasing forces applied through the control 72 may be configured to (alternatively or in addition to the "virtual braking," described above) provide feedback to an operator as if the operator were activating a traditional clutch of the vehicle 20 (described herein as providing a virtual clutch). In particular, when a biasing force is applied to the control 72, a torque request (for either of a positive or negative torque amount) may be generated and applied to the electric motor 58 of the motorcycle, wherein the amount of torque included in the request corresponding to a position of the control 72. For example, when the control 72 is fully actuated (for example, fully pulled in when the control 72 is a pivoting lever), the corresponding torque request is 0% and when the control 72 is not actuated (for example, not pulled in when the control 72 is a pivoting lever), the corresponding torque request is 100%. The amount of torque applied may be any percentage between 100% and 0% based on the particular position of the control 72 (the amount in which the control 72 is actuated). In implementing the virtual clutch, the ECU 600 may be configured to, in the determination of the torque command at block 94 of the method 80, multiply the requested driving torque and the requested torque (a percentage corresponding to the position of the control 72) and determine the amount of torque in the torque command based on the resulting product. In other words, application of the control 72 results in reducing the requested torque command (whether it is positive or negative torque) towards zero, with zero torque being requested when the lever is fully pulled in, regardless of any regeneration settings or twist grip 74 position).

Figure 8:
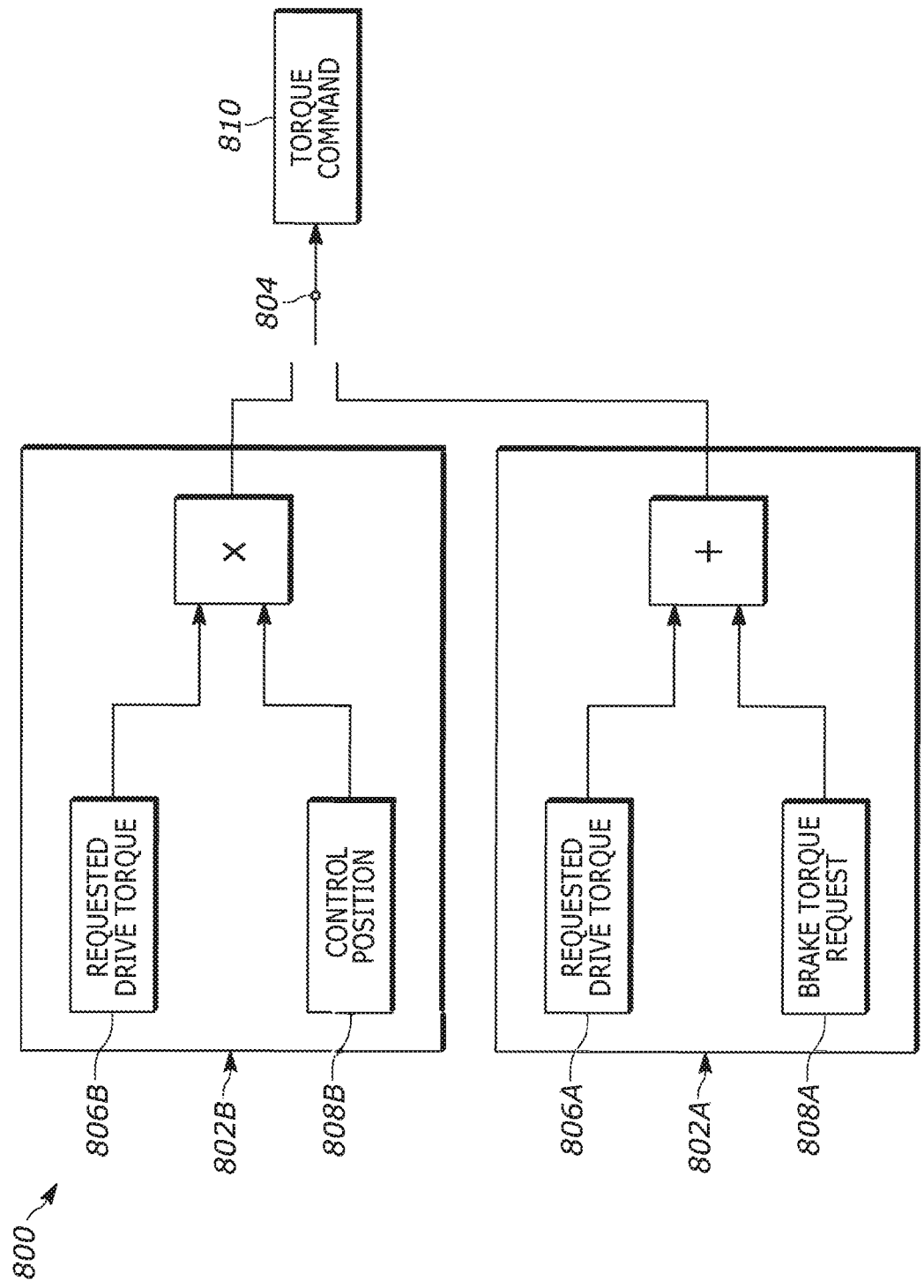
FIG. 8 schematically illustrates a diagram for generating a virtual braking and a virtual clutch in the two-wheeled vehicle of FIG. 1 according to one embodiment.

The ECU 600 may be configured to provide either or both of the virtual brake and the virtual clutch. In some embodiments, when only the virtual clutch is provided, the vehicle 20 may include only a purely mechanical braking system. In embodiments where both the virtual brake and the virtual clutch are provided, an operator of the vehicle 20 may select either of the virtual brake or virtual clutch to engage via a separate or a common input mechanism (for example, a dial, switch, and the like). For example, FIG. 8 is a diagram 800 illustrating a virtual brake process flow 802A and a virtual clutch process flow 802B. A user of the vehicle 20 may select which process to use via input mechanism 804 (illustrated as a switch). As illustrated in the virtual brake process flow 802A, the driving torque request (requested drive torque 806A) determined at block 86 of method 80 of FIG. 5 is added to the requested torque (brake torque request 808A). In the process of determining the requested torque 808A, in the case of the virtual brake, the ECU 600 determines the requested torque 808A by dividing a position of the control 72 by a maximum twist grip 74 position, the result of which may then be multiplied by a maximum (braking) torque (FIG. 7).

Returning to FIG. 8, the virtual clutch process flow 802B may include multiplying the requested driving torque (requested drive torque 806B) by a position of the control 72 (position 808B). Here, the amount of torque applied according to the torque command 810 is determined independent of the twist grip 74 position.

In some embodiments, as described above, the rear wheel 24 is braked using solely regenerative braking. However, in other embodiments, the rear wheel 24 also includes a mechanical brake, which the operator may activate through activation of a separate actuator on the vehicle 20. For example, in some embodiments, an operator may be able to selectively turn regenerative braking on and off, such as through selection of one or more ride modes. For example, one or more of the ride modes available to an operator may provide regenerative braking while other ride modes may only provide frictional, mechanical braking. Also, in some embodiments, the operator may use the same actuator to apply regenerative braking or mechanical braking and the type of braking applied may be based on the currently selected ride mode, current operating parameters of the vehicle 20, current environmental conditions, or the like. For example, in some embodiments, a control system included in the vehicle 20 may automatically determine whether to apply regenerative braking, mechanical braking, or a combination thereof. Accordingly, in some embodiments, through activation of a single braking control, an operator may specify a requested braking amount, and a control system included in the vehicle 20 may automatically determine what type of braking to apply to satisfy the request (including a combination of braking types in some situations).

Also, the braking described above for the rear wheel 24 may similarly be applied to the front wheel 22. Accordingly, in some embodiments, the vehicle 20 does not include any mechanical, frictional brakes and, rather, uses regenerative braking as the sole mechanism for slowing and stopping the vehicle 20.

In addition, the vehicle 20 described herein is provided as one example of a motorcycle including the disclosed regenerative braking and associated control. The regenerative braking, however, described herein can be used in other motorcycles 20 (and other types of vehicles). For example, in some embodiments, the vehicle 20 is powered by an internal combustion engine (ICE) in place of or in addition to the electric powertrain. In this embodiment, the vehicle 20 including the ICE may use regenerative braking as the sole mechanism for braking both wheels of the vehicle 20 as described above. Alternatively, the vehicle 20 including the ICE may use regenerative braking as the sole mechanism of braking one wheel, such as the rear wheel 24, but may include a mechanical brake, such as a frictional disc brake, to brake the other wheel.

Various features and advantages of the invention are set forth in the following claims.

What is claimed is:

1. A vehicle comprising:
an electric motor;
a wheel drivably coupled to the electric motor to propel the vehicle;
a drive torque control movable between a first plurality of positions;
a regenerative brake control movable between a second plurality of positions; and
an electronic control unit configured to
detect a position of the drive torque control from the first plurality of positions,
map the detected position of the drive torque control to a requested driving torque,
detect a position of the regenerative brake control from the second plurality of positions,
map the position of the regenerative brake control to a requested braking torque,
sum the requested driving torque and the requested braking torque to determine a torque command, and
transmit the torque command to the electric motor.

2. The vehicle of claim 1, wherein the wheel includes a rear wheel of the motorcycle.

3. The vehicle of claim 1, further comprising an electric power store powering the electric motor, wherein, when the torque command is negative, the electric motor regeneratively brakes the wheel and energy captured during the regenerative braking is stored in the electric power store.

4. The vehicle of claim 1, wherein the drive torque control includes a twist grip positioned on a handlebar of the vehicle.

5. The vehicle of claim 1, wherein the drive torque control is positioned on a right side of a handlebar of the vehicle.

6. The vehicle of claim 1, wherein the regenerative brake control includes a pivotable lever positioned on a handlebar of the vehicle.

7. The vehicle of claim 1, wherein the regenerative brake control includes a foot pedal.

8. The vehicle of claim 1, wherein the regenerative brake control is positioned on a left side of a handlebar of the vehicle.

9. The vehicle of claim 1, wherein the electronic control unit is configured to map the detected position of the drive torque control to the requested driving torque based on the position of the drive torque control and a speed of the vehicle.

10. The vehicle of claim 9, wherein the speed of the vehicle is represented by a revolutions per minute of the electric motor.

11. The vehicle of claim 1, wherein the electronic control unit is configured to map the detected position of the drive torque control to the requested driving torque by accessing a two-dimensional table mapping the position of the drive torque control and a speed of the vehicle to the requested driving torque.

12. The vehicle of claim 1, wherein the electronic control unit is configured to map the detected position of the drive torque control to the requested driving torque by accessing a table associated with a currently-activated ride mode of a plurality of ride modes.

13. The vehicle of claim 1, wherein the electronic control unit is configured to map the detected position of the regenerative brake control to the requested braking torque based on an equation, the equation including dividing a position of the regenerative brake control by a predetermined maximum position and multiplying a result of the division by a predetermined maximum braking torque.

14. The vehicle of claim 1, wherein regenerative braking provided via the electric motor based on the torque command is the sole braking mechanism provided for the wheel.

15. A method of operating an electric motor of a vehicle, the method comprising:
  detecting a position of a first control included in the vehicle, the first control controlling a drive torque of the vehicle;
  detecting a position of a second control included in the vehicle;
  mapping the detected position of the first torque control to a first requested torque;
  mapping the position of the second control to a second requested torque;
  determining, with an electronic control unit, a torque command based on the first requested torque and the second requested torque; and
  transmitting the torque command to an electric motor included in the vehicle,
  wherein determining the torque command includes multiplying the first requested torque and the second requested torque.

16. The method of claim 15, wherein determining the torque command includes summing the first requested torque and the second requested torque.

17. A system for operating an electric motor of a vehicle, the system comprising:
  at least one electronic control unit included in the vehicle, the at least one electronic control unit configured to:
    detect a position of a first control included in the vehicle, the first control controlling a drive torque of the vehicle,
    detect a position of a second control included in the vehicle,
    map the detected position of the first control to a first requested torque,
    map the position of the second control to a second requested torque,
    determine a torque command based on the first requested torque and the second requested torque, and
    transmit the torque command to an electric motor included in the vehicle to regeneratively brake a wheel of the vehicle, wherein regenerative braking provided via the electric motor based on the torque command is the sole braking mechanism provided for the wheel.

18. The system of claim 17, wherein the electronic control unit determines the torque command by summing the first requested torque and the second requested torque.

19. The system of claim 17, wherein the electronic control unit determines the torque command based on a product of the first requested torque and the second requested torque.

* * * * *